United States Patent [19]
Fedor et al.

[11] 4,078,898
[45] Mar. 14, 1978

[54] CATALYST-COATED EXPANDED METAL FOIL SUBSTRATE FOR AN EXHAUST GAS REACTOR

[75] Inventors: Robert J. Fedor, Westlake; Cameron S. Ogden, Hudson, both of Ohio

[73] Assignee: Gould Inc., Rolling Meadows, Ill.

[21] Appl. No.: 712,660

[22] Filed: Aug. 9, 1976

Related U.S. Application Data

[63] Continuation of Ser. No. 441,504, Feb. 11, 1974, abandoned, which is a continuation-in-part of Ser. No. 149,331, June 2, 1971, abandoned, and Ser. No. 207,338, Dec. 13, 1971, abandoned.

[51] Int. Cl.² .......................... B01J 3/00; F01N 3/15
[52] U.S. Cl. ......................... 23/288 FC; 23/288 FB; 60/301; 252/470; 252/477 R
[58] Field of Search ........ 23/288 FC, 288 R, 288 FB; 60/299, 300, 301; 252/477 R, 470; 423/213.2, 213.5, 213.7

[56] References Cited

U.S. PATENT DOCUMENTS

| 1,858,741 | 5/1932 | Jost .............................. 252/477 R X |
| 1,932,927 | 10/1933 | Fischer ........................... 23/288 FC |
| 1,934,795 | 11/1933 | Frazer ............................ 423/213.5 X |
| 2,526,657 | 10/1950 | Guyer ............................. 23/288 R |
| 2,607,663 | 8/1952 | Perry et al. ..................... 23/288 R |
| 2,995,199 | 8/1961 | Myers ............................ 23/288 F UX |
| 3,208,131 | 9/1965 | Ruff et al. ..................... 23/288 FC UX |
| 3,362,783 | 1/1968 | Leak ............................. 23/288 FC UX |
| 3,410,651 | 11/1968 | Brandenburg et al. ... 23/288 FC UX |
| 3,425,216 | 2/1969 | Bjork ............................ 23/288 F X |
| 3,533,753 | 10/1970 | Berger ........................... 23/288 FC |
| 3,546,075 | 12/1970 | Sheetz et al. .................... 156/8 |
| 3,597,165 | 8/1971 | Keith et al. ..................... 23/288 FC |
| 3,768,981 | 10/1973 | Alliger ......................... 23/288 FC UX |

FOREIGN PATENT DOCUMENTS

| 567,480 | 3/1924 | France ............................ 252/477 R |
| 1,132,899 | 7/1962 | Germany ........................ 252/477 R |

OTHER PUBLICATIONS

Chemical Abstracts; 13258g; vol. 59; 1963; "Elimination of Nitrogen Oxides from Exhaust Gases."

Primary Examiner—Barry S. Richman
Attorney, Agent, or Firm—Russell E. Baumann; Edward E. Sachs

[57] ABSTRACT

A system for reducing $NO_x$ gases found in the exhaust stream of the internal combustion engine is provided which includes an internal combustion engine having associated therewith a means for supplying fuel and oxygen to the engine, a manifold system for directing or channeling the exhaust gases from the engine, and a $NO_x$ reducing catalyst assembly communicating with the manifold which includes a housing having a $NO_x$ reducing catalytic structure of apertured thin metal foil positioned therein. In addition, an article composed of a catalytic material for reducing the oxides of nitrogen in exhaust gases from an internal combustion engine is also provided. The article includes a self-supporting catalytic structure in the form of an apertured, thin metal foil having a ratio of low mass to high surface area. In its preferred form, the foil is an expanded metal foil and is formed by tightly winding the foil into a plural layer helical coil.

7 Claims, 8 Drawing Figures

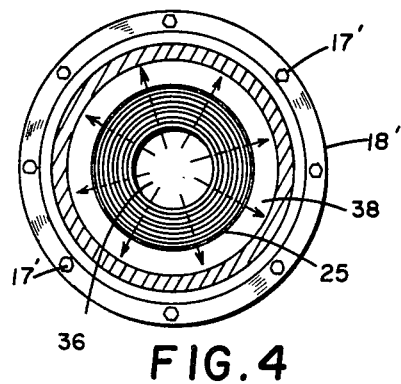
FIG. 4
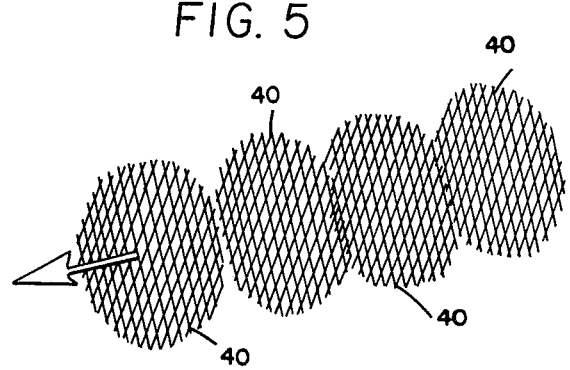
FIG. 5
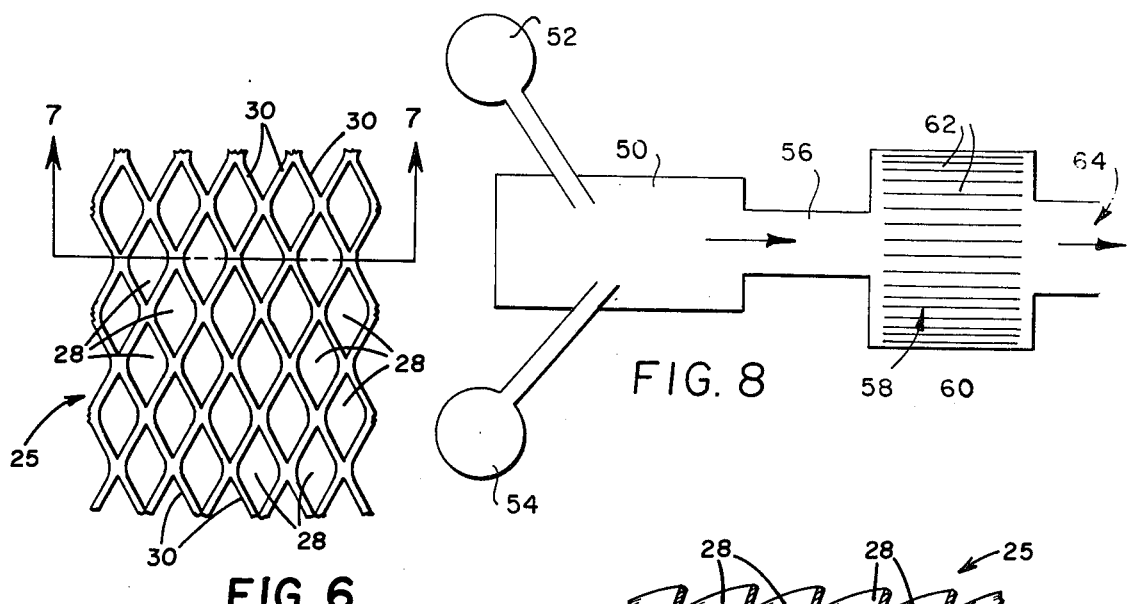
FIG. 6
FIG. 8
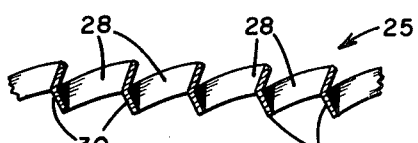
FIG. 7

CATALYST-COATED EXPANDED METAL FOIL SUBSTRATE FOR AN EXHAUST GAS REACTOR

BACKGROUND OF THE INVENTION

This is a continuation, of application Ser. No. 441,504, filed February 11, 1974 and now abandoned, which is in turn a continuation-in-part application of U.S. Pat. application Ser. No. 149,331, filed June 2, 1971, now abandoned and U.S. Pat. application Ser. No. 207,338, filed Dec. 13, 1971.

The subject invention is directed to the art of emission control devices and, more particularly, to a system and an improved article, of a suitable metallurgical composition, whose structure is particularly suited for reducing the oxides of nitrogen, especially nitric oxide and nitrogen dioxide (herein collectively referred to as $NO_x$), which are commonly found in the exhaust gases emanating from an internal combustion engine.

More particularly, the invention concerns a system for the removal of significant amounts of $NO_x$ from the exhaust gases of the internal combustion engine which includes the use of a catalytic structure which can be mounted in the exhaust system of an internal combustion engine and which is characterized by its efficacy in reducing the various oxides of nitrogen ($NO_x$) at temperatures of about 1100° F and above.

Description of the Prior Art

The exhaust scream emanating from an internal combustion engine typically contains many undesirable gases. Some of the more harmful and annoying of these gases include carbon monoxide, unburned hydrocarbons, and the oxides of nitrogen.

Much current development work is being directed to systems for the removal of carbon monoxide and unburned hydrocarbons by thermal or catalytic oxidation while the elimination or diminution of oxides of nitrogen is being attempted by catalytic reduction. With particular regard to the oxides of nitrogen it is presently desired to eliminate at least 90% of the $NO_x$ issuing from the typical internal combustion engine, using the 1971 model vehicle as the base. One system for the reduction of $NO_x$ utilizes a catalyst in the form of Berl saddles, while others employ metal catalysts supported by ceramic substrates.

The prior art discloses many catalysts and systems which are, at least in theory, capable or reducing $NO_x$ to less harmful substances. However, the prior art does not contain any reference or teaching which discloses how the various catalysts can be incorporated in a device so that their efficacy is sustained for a useful time period. It is presently believed that, at least in part, these deficiencies are due to the structural characteristics of these metallurgical systems, and particularly the geometric configuration thereof.

An extensive analysis of various catalytic structures, and problems pertaining thereto, was published by the Society of Automotive Engineers on July 11, 1971, entitled "$NO_x$ Reduction Catalyst for Vehicle Emission Control", under SAE, paper No. 710291. This paper includes the disclosure of a composite of copper and stainless steel in the form of wire mesh screen. Still other approaches are indicated in U.S. Pat. No. 3,565,574 and British Pat. No. 1,058,706. The latter patent discloses a ceramic substrate on which is coated a $NO_x$ reducing material.

A major disadvantage of these, and other, prior catalyst structures has been a low surface area to mass ratio. As a consequence, the time required to bring the structures up to operating temperature is comparatively long. Throughout this warm-up period emission of unreduced oxides of nitrogen takes place. Moreover, generally speaking, for a given mass of structure, the greater the area of catalytically active surface presented to the exhaust stream, the more efficient the reduction process. Consequently, structures which embody a low surface area to mass ratio will not perform as effectively as would be the case should the ratio be increased.

Attempts to increase the gross surface area of the structure usually result in a larger catalytic mass which has the effect of increasing the warm-up period, with consequent reduction in catalyst efficiency. Further, the introduction of increased mass into the exhaust stream produces an undesirable obstruction to the flow of gases through the system, thus generating build-up in the back pressure which adversely affects the operation of the engine.

The subject invention overcomes the above discussed problems associated with prior devices and provides an efficient, durable $NO_x$ reducing catalytic structure capable of operating for extended periods of time with a high degree of efficacy and low back-pressure build up. Structures formed in accordance with the invention can provide a high surface area to mass ratio.

Brief Description of the Invention

According to one aspect, the instant invention encompasses a system for catalytically reducing $NO_x$ found in the exhaust gases emanating from the internal combustion engine which comprises an internal combustion engine having associated therewith a means for supplying fuel and oxygen thereto, a manifold system or arrangement which directs the flow of exhaust gases from the engine, and a $NO_x$ reducing catalyst assembly including a housing having a $NO_x$ reducing catalytic structure means of apertured thin metal foil therein communicating with the manifold.

According to another aspect, the invention contemplates an article for reducing the oxides of nitrogen in exhaust gases from an internal combustion engine and comprises a catalytic structure adapted to be placed in a housing through which the exhaust gases flow. The structure is sized so that a major portion of the gases passing through the housing must pass through the structure. The structure includes an apertured, thin metal foil of a material effective catalytically to reduce $NO_x$.

Preferably, and in accordance with a more limited aspect of the invention, the foil has a surface area to mass ratio in the range of approximately 2 to 16 square inches per gram. This area is determined by linear dimension only, which is to say that the measurement excludes the additional surface area defined by peaks and valleys obtained through surface treatment. This additional surface area can be obtained, if desired, through the use of conventional techniques for roughening the surface of the foil. As is apparent, ratios of this magnitude promote rapid heat-up, increased efficiency and minimization of back-pressure build up.

It is also contemplated that the foil will preferably be expanded to provide an open mesh structural configuration, and will be tightly wound in a plural layer helical coil. Additionally, the portions of material between the openings in the expanded foil are twisted and/or inclined relative to the mean plane of the foil sheet. Thus, when assembled into a plural layer structure, an extremely tortuous circuitous path with substantial impingement and scrubbing of the gases against the catalytic surfaces of the foil is assured. Moreover, the resulting structure can have a density of in the range of only 2 to 12 percent of an equivalent solid volume of the foil material.

It is, of course, to be understood, that the metal foil is formed from a metal or alloy having particularly good corrosion resistance and high temperature strength. For example, a corrosion resistant nickel base foil has been used for the substrate and a $NO_x$ reducing catalyst selected from the group consisting of iron, nickel, cobalt, copper, manganese and mixtures thereof have been metallurgically bonded to the substrate. Other types of foils formed from different substrates and reducing catalysts have been proposed. These various substrate-catalyst combinations are disclosed and claimed in the commonly assigned, copending in U.S. Pat. applications Ser. Nos. 207,284, 207,525, 207,337, 207,303 and 207,281, entitled Nickel Base $NO_x$ Reducing Catalytic Structure, Cobalt Base $NO_x$ Reducing Catalytic Structure, Self-Supporting $NO_x$ Reducing Catalyst, Chromium Containing Iron Base $NO_x$ Reducing Catalytic Structure and Aluminum Containing Iron Base $NO_x$ Reducing Catalytic Structure, respectively, filed concurrently herewith and incorporated herein by reference.

Various more limited aspects of the invention contemplate that the catalytic structure can be formed in several different configurations. For example, the catalytic mass can be formed by coiling the expanded metal foil tightly around a central mandrel of small diameter. Alternately, the catalytic structure can be a hollow, tightly wound coil and positioned in the housing so that the gas flows radially through the wound coil. In both of these configurations a multiplicity of relatively circuitous gas flow paths are provided.

It is also contemplated that the layers can be individual separate sheets merely stacked tightly in the housing. The catalytic structure irrespective of its particular form should desirably substantially completely fill the cross-section of the housing so that the majority of all gas passing through the housing must pass through the catalytic structure.

Tests have shown that structures of the type herein set forth have significant advantages over other types of catalytic structures such as screen, saddles, or the like. It is possible, although this has not as yet been established, that such advantages are derived from the fact that an expanded metal provides, in addition to a ratio of low mass to high surface area, a structure in which the gases which pass through the openings are deflected by the sharp edges, thereby increasing the contact between the gas and the metal foil.

As will be appreciated from the drawings, the diamond shaped pattern provides for a structured relationship in which the majority of the surface extends angularly to the plane of the structure as a whole and each leg of the diamond again has an angular relationship to the adjacent legs of the same diamond as well as to the contiguous diamonds. This pattern, it is believed in conjunction with the increased surface area, appears to establish the proper environment for the gaseous material so that the metallurgical system of which the structure is composed, can suitably interact with the gases.

Accordingly, a major object of the invention is to provide a system for catalytically reducing $NO_X$ found in the exhaust gases of the internal combustion engine.

Accordingly, a primary object of the invention is the provision of an improved catalytic structure exhibiting high efficiency and durability with low back-pressure.

A further object of the invention is the provision of an apparatus of the general type described wherein the catalytic structure comprises a self-sustaining assembly of expanded metal foil.

Yet another object is a provision of $NO_X$ reducing structure capable of prolonged operation at high temperatures without loss of efficiency or build up of back-pressure.

The above and other objects and advantages will become apparent from the following description when read in conjunction with the accompanying drawings wherein:

FIG. 4 is a cross-sectional view taken on line 4—4 of FIG. 3;

FIG. 5 is an exploded pictorial view showing a modified form of foil mass for the assembly;

FIG. 6 is a greatly enlarged plan view of a section of the expanded metal foil;

FIG. 7 is a cross-sectional view taken on line 7—7 of FIG. 6; and

FIG. 8 is a diagrammatical illustration of the system of the invention.

Figure 1:
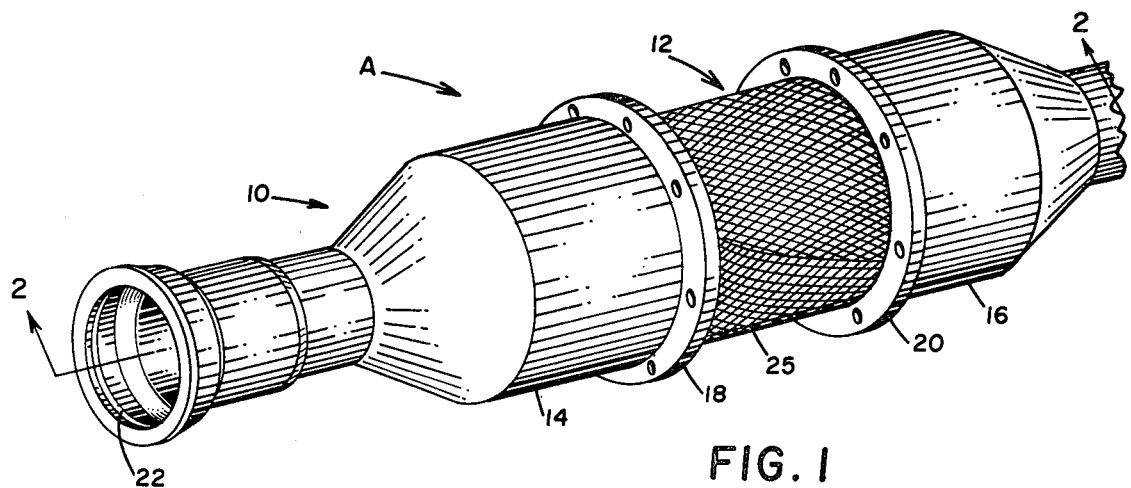
FIG. 1 is an exploded pictorial view showing a $NO_X$ reducing catalyst structure formed in accordance with the preferred embodiment of the invention.
Figure 2:
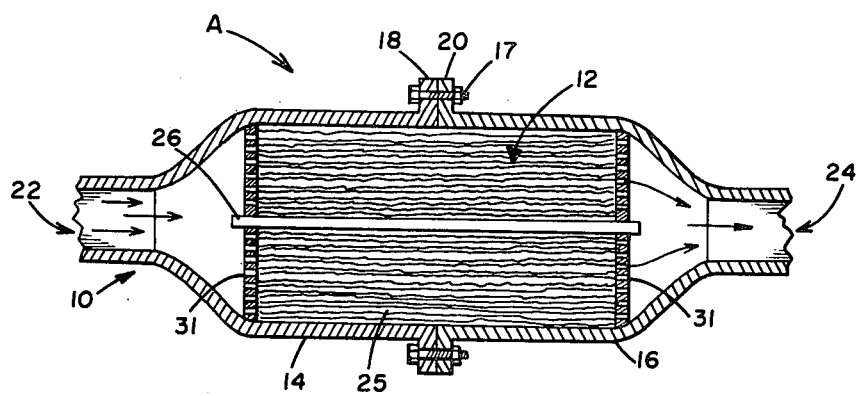
FIG. 2 is a longitudinal cross-sectional view through the device of FIG. 1 showing the device in assembled relationship (the view is taken on line 2—2 of FIG. 1)

Referring more particularly to the drawings wherein the showings are for the purpose of illustrating preferred embodiments of the invention only and not for the purpose of limiting same, FIGS. 1 and 2 show the overall arrangement of a $NO_X$ reducing assembly A which includes a housing 10 adapted to be mounted in the exhaust system of an internal combustion engine. Carried within the housing 10 is the catalytic structure 12. In the embodiment under consideration, structure 12 is sized and located in the housing 10 in a manner such that all, or substantially all, of the gas passing through the housing is required to pass through the catalytic structure 12.

The actual structural configuration and details of the housing 10 are not particularly critical to the invention and many different types of housings could be used. In the subject embodiment, however, housing 10 comprises a pair of generally bellshaped sections 14 and 16 which are separably joined by suitable bolts 17 which interconnect mating flanges 18 and 20. Bell sections 14 and 16 together define a flow passage having inlet and outlet openings 22, 24, respectively. In the embodiment shown, inlet and outlet openings 22, 24 are arranged to receive the exhaust pipes of an internal combustion engine. It should be understood that the material from which the housing is formed could vary widely provided it has the necessary strength and durability to withstand the operating conditions and temperatures which may be as high as 1100° F to 1700° F.

Positioned within housing 10 is the catalytic structure 12. According to the invention, the structure 12 comprises a mass or arrangement of thin, apertured metal foil which is relatively tightly compacted. In the subject embodiment, the foil is an expanded metal foil 25 which is wound tightly upon a small steel mandrel 26 to a diameter to be closely received within the housing 10. The geometric relationship between the foil, the exterior of the mandrel 26 and the interior of the housing 10 should be such as to effectively eliminate paths through which exhaust gases may pass without the requisite impingement upon the catalytic metal foil.

FIGS. 6 and 7 show the preferred form for the foil 25. As illustrated, it comprises a multiplicity of closely spaced openings 28 separated by narrow, gas impervious portions which, in effect, form elongated strands 30. As best shown in FIGS. 6 and 7, the strand portions in intermediate rows of openings 28 are preferably inclined or twisted relative to the mean plane of the foil sheet. As can be appreciated, openings 28 are formed merely by slitting the metal foil and expanding it by applying tension to the foil sheet in a direction generally perpendicular to the direction of the slitting. This typically produces a twist to the intermediate foil sections as shown in FIG. 7.

According to an aspect of the invention, the expanded foil sheet preferably has a thickness in the range of from 0.001 inches to 0.01 inches and a surface area to mass ratio of between approximately 16 and 2 square inches per gram as determined by linear dimension only. Additional surface area can be obtained by conventional subtractive, additive or other roughening surface treatment.

Referring again to FIGS. 1 and 2, it will be seen that the expanded foil 25 is tightly wound upon the mandrel 26 in stacked, ever increasing convolutions. The strip is wound tightly on the mandrel so that the resulting foil arrangement has a large void volume and a density of in the range of approximately 2 to 12 percent the density of an equivalent solid volume of the metal from which the foil is made. This can vary, of course, depending upon the foil and the expanding parameters. However, merely by way of comparison, this structure has about one-tenth the mass of the prior art saddle bed. This increases the heat-up rate by about a factor of four.

Because of the nature of the foil and the winding process, the openings 28 in each layer are somewhat randomly located relative to those in adjacent layers. The resulting assembly thus provides a large number of circuitous flow paths so that as gas passes through the assembly it is continually subject to changes in flow direction resulting in repeated impingement of the gas molecules with the catalytic surface of the foil. However, because of the large number of voids and relatively low density of the foil arrangement, the back-pressure is comparatively low.

In the structural embodiment of FIGS. 1 and 2, the ends of the foil arrangement are protected by perforated metal plates 31 which are, for example, press-fitted on mandrel 26. These plates are desirable in that they prevent crushing of the ends of the foil arrangement during handling, shipping, etc. Also, under some operating conditions, the ends could possibly be damaged if the plates were not present.

The foil can be made from many different metals, alloys, and combinations thereof. The commonly assigned copending applications mentioned earlier describe several such combinations which are particularly suitable. In any event, at least a major portion of the surface of the foil should comprise an effective amount of $NO_x$ reducing catalyst. This can be accomplished by adherently depositing a suitable $NO_x$ catalyst material on the surface of metal foil or substrate.

Figure 3:
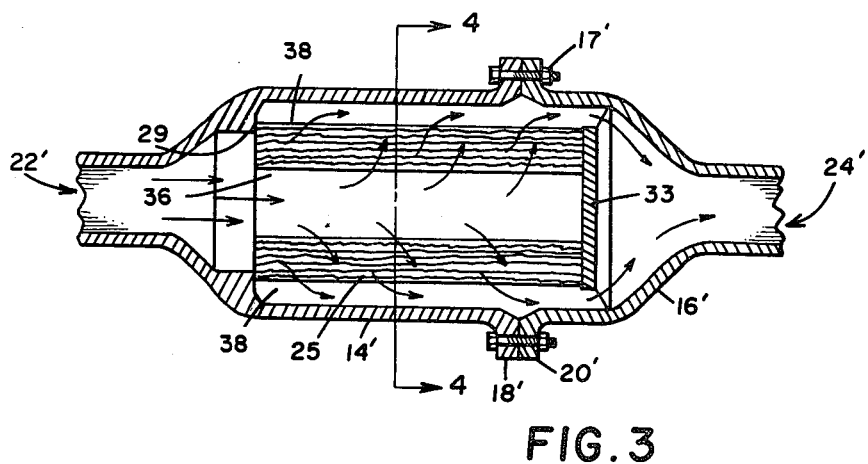
FIG. 3 is a longitudinal cross-sectional view similar to FIG. 2 but showing a modified form of the invention.

FIG. 3 shows a modified form of structure embodying the invention. In this embodiment, the housing is illustrated as generally the same as that shown in the FIGS. 1 and 2 embodiment and accordingly the same reference numerals differentiates by a prime (') suffix have been used to identify corresponding elements. A description of the FIGS. 1 and 2 element is to be taken as equally applicable unless otherwise noted. The main difference shown in the housing construction is that bell section 14' is somewhat longer than bell section 16'. Also, an internal shoulder 29 is formed within bell section 14'.

The expanded metal foil 25 is tightly wound into a spiral assembly having an open inner diameter 36 which is of a diameter appoximately equal to the inlet 22. The outer diameter of the assembly is, however, less than the inner diameter of the housing. This provides an open flow passage 38 circumferentially about the spiral wound foil arrangement. The catalytic structure is positioned in the housing and a baffle or plate 33 extends across the end of the foil arrangement as shown. The plate 33 is suitably supported from the housing in a manner which will not greatly impede flow about the edges of the plate but will prevent flow axially through the mass. As it can be appreciated, in this embodiment, the gas entering the housing is caused to flow generally radially through the mass as shown in FIG. 4.

FIG. 5 illustrates a third manner in which the foil mass can be formed. In this embodiment, the foil arrangement is formed from a multiplicity of discs or wafers 34 of the foil 25. The discs are merely tightly stacked together in aligned relationship. The openings 28 in each disc are, however, preferably randomly located relative to those in adjacent discs. The flow arrow in FIG. 5 shows gas flow as taking place axially through the mass. This is preferred but the foil arrangement could also be used in environments where flow takes place through its diameter.

The total surface area required for a given installation will, of course, depend upon the catalyst used, the quantity of $NO_x$ in the exhaust gas, the volume of gas, and various other operating conditions. In any case, it will be recognized that the mass of catalytic structure necessary to produce a given required surface area is much reduced relative to prior art structures through the application of the concepts herein disclosed.

In FIG. 8 there is shown the system of the invention for catalytically reducing $NO_x$ found in the exhaust stream of the internal combustion engine which system includes an internal combustion engine 50 having communicating therewith a source of fuel 52 and a source 54 of an oxidant (oxygen from air) for the fuel. During operation of the internal combustion engine 50 exhaust gases are generated which pass through the manifold or conduit 56 into the $NO_x$ reducing catalyst assembly or apparatus 58 which includes a housing 60 having a $NO_x$ reducing catalyst structure 62 composed of a sheet of expanded, thin metal foil positioned therein. The exhaust gases, after $NO_x$ reduction, then exit from port 64. The catalyst structure 62 therein, by catalytic reduction, affects the removal of a significant amount of $NO_x$ therefrom. In the dual bed system, after the $NO_x$ reduction treatment, the exhaust gases are then brought into contact with an oxidation catalyst to remove carbon monoxide and gaseous hydrocarbons therefrom. As such oxidation catalysts are well known in the art, they will not be discussed herein in detail.

In the preferred practice of the system of the invention the internal combustion engine is operated in a manner such that the exhaust gases therefrom contain relatively low amounts of unreacted oxygen. Preferably less than 1 volume percent of unreacted oxygen is present. Usually, this is accomplished by operating the engine with an air/fuel ratio on the rich side of stoechimetric (rich referring to excess fuel) which is primarily achieved by adjusting the carburetion setting. It is also contemplated to utilize fuel injection as well as other conventional means to supply the engine with the necessary amounts of fuel and oxidant therefor. In the preferred practice of the system of the instant invention it is generally desirable to operate the internal combustion engine in a manner such that the air/fuel ratio generally ranges from about 13.8 to 1 to about 14.5 to 1. However, it will be appreciated by those skilled in the art that depending on the specific fuel utilized, the type of catalyst employed and the temperature at which the gases contact the concerned catalyst, this ratio may vary slightly. In general, it can be stated that the ratio of carbon monoxide to oxygen found in the exhaust gas should be about ten to one.

The preferred $NO_x$ reducing catalyst material proper is an alloy of nickel and copper wherein the weight ratio of nickel to copper is greater than 9 to 1. This material is described in copending application Ser. No. 305,738 which is assigned to the assignee of the instant application. Such a catalyst structure is characterized by the fact that it does not significantly catalyze the reaction of nitrogen and hydrogen to form ammonia. Obviously, catalysts having other ratios of nickel to copper may also be utilized. In addition, other known $NO_x$ reducing catalysts may be employed in the practice of the instant invention, including, but not limited to, iron, nickel, copper, cobalt, manganese and mixtures thereof.

The following example illustrates the $NO_x$ reducing system of the invention:

(a) An internal combustion engine having associated therewith a conventional carburetion system for supplying fuel and oxygen to the engine is provided, with the carburetor therefor being pre-set to have an air to fuel ratio of about 14.2 to 1.

(b) The engine was operated rich so as to cause the exhaust gases to contain a low amount of unreacted oxygen.

(c) The exhaust gases emanating from the engine were then brought into contact with a $NO_x$ reducing catalyst consisting of an expanded metal substrate composed of an iron base alloy (about 70 weight percent iron and containing about 30 weight percent chromium) which had on the surface thereof a layer of a $NO_x$ reducing catalyst material composed of about 95 weight percent nickel and 5 weight percent copper.

The exhaust gases before contacting the $NO_x$ reducing catalyst material contained about 0.6 volume percent oxygen and about 600 ppm of $NO_x$. The temperature at which the exhaust gases were brought into contact with the $NO_x$ reducing catalyst material was about 1210° F. An analysis of the gases emanating from the $NO_x$ reducing catalyst assembly showed that the oxygen content thereof was about 0.02 volume percent and that the $NO_x$ content had been reduced to about 1.8 ppm.

(d) The so-treated exhaust gases, containing about 1.65 volume percent carbon monoxide and about 210 ppm unburned hydrocarbon gases (as butane), were then brought into contact with a conventional oxidation catalyst in an oxygen containing atmosphere. The catalyst employed was a honeycomb structure of alumina having deposited on the surface thereof active platinum. The amount of carbon monoxide and hydrocarbon gases found in the so-treated exhaust gases was about 0.04 volume percent and 60 ppm, respectively. The net $NO_x$ conversion or reduction was about 94 percent.

From the foregoing, it can be readily seen that the instant invention provides a unique means of effectively and efficiently reducing nitrogen oxide ($NO_x$), carbon monoxide and unburned hydrocarbon gases from the exhaust stream of the internal combustion engine.

While there have been described herein what are at present considered to be the preferred embodiments of the instant invention, it will be obvious to those skilled in the art that various changes and modifications may be made therein without departing from the spirit and scope of the invention and it is aimed, therefor, in the appended claims to cover all such changes and modifications and may fall within the true spirit and scope of the invention.

What is claimed is:

1. An article for catalytically reducing oxides of nitrogen ($NO_x$) found in exhaust gases emanating from an internal combustion engine, said article comprising a catalytic structure means comprising a mass of expanded thin metal foil, said foil from which said mass of foil is formed having an average thickness of less than 0.01 inch, said expanded foil having a surface area to mass ratio in the range of approximately 2 to 16 square inches per gram, said area being determined by linear dimension only, said expanded foil further having a density in the range of approximately 2 to 12 percent of the density of a solid sheet of the metal from which the expanded metal is formed, said structure comprising a metallic, corrosion-resistant, nickel-chromium based substrate having coated on its surface a copper-nickel alloy catalyst capable of catalyzing the reduction of $NO_x$ gases in said exhaust gases.

2. The article as defined in claim 1 wherein said mass comprises expanded metal foil wound in a tight helical coil.

3. In a combustion engine exhaust system having a catalytic converter for catalytically reducing oxides of nitrogen ($NO_x$) in the exhaust gases emanating from an internal combustion engine, said converter having catalytic means effective to reduce $NO_x$ contained in said gases, the improvement wherein the catalytic means comprises a mass of expanded thin metal foil, said mass of expanded foil having a surface area to mass ratio in the range of approximately 2 to 16 square inches per gram, said area being determined by linear dimension only, said mass of expanded foil having a density in the range of approximately 2 to 12 percent of the density of a solid sheet of the metal from which the expanded metal is formed, said foil from which said mass of foil is formed having an average thickness of less than 0.01 inch, said catalytic means comprising a metallic, corrosion-resistant, nickel-chromium based substrate having on the surface thereof a coating of a copper-nickel alloy catalyst capable of catalyzing the reduction of $NO_x$ gases in said exhaust gases.

4. The article as defined in claim 3 wherein said mass of expanded metal foil is a spirally wound sheet of expanded metal foil.

5. The article as defined in claim 3 wherein said catalytic means comprises a series of stacked sheets of said foil.

6. The combination of claim 3 wherein said mass of foil comprises a plurality of closely-packed layers having a multiplicity of closely-spaced small apertures.

7. The article of claim 6 wherein the apertures of said layers are randomly located relative to the apertures in adjacent layers.

* * * * *